(12) United States Patent
Burukhin et al.

(10) Patent No.: US 12,411,832 B2
(45) Date of Patent: Sep. 9, 2025

(54) CUMULATIVE LOCALIZATION ARCHITECTURE

(71) Applicant: Microsoft Technology Licensing, LLC, Redmond, WA (US)

(72) Inventors: Anatoliy Burukhin, Redmond, WA (US); Alexey Soloveychik, Bellevue, WA (US); Constantin Sorin Oprea, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 18/451,193

(22) Filed: Aug. 17, 2023

(65) Prior Publication Data

US 2025/0061105 A1   Feb. 20, 2025

(51) Int. Cl.
*G06F 16/23* (2019.01)
*G06F 16/25* (2019.01)
*G06F 40/58* (2020.01)

(52) U.S. Cl.
CPC .............. *G06F 16/23* (2019.01); *G06F 40/58* (2020.01); *G06F 16/25* (2019.01)

(58) Field of Classification Search
CPC ........... G06F 16/23; G06F 40/58; G06F 16/25
See application file for complete search history.

(56) References Cited

U.S. PATENT DOCUMENTS

| | | |
|---|---|---|
| 2003/0115552 A1 | 6/2003 | Jahnke et al. |
| 2011/0179073 A1 | 7/2011 | Nilsson |
| 2014/0258979 A1* | 9/2014 | Zhang ....................... G06F 8/70 717/120 |
| 2017/0344538 A1 | 11/2017 | Horai |
| 2019/0205429 A1 | 7/2019 | Lee |
| 2020/0057773 A1* | 2/2020 | Gamzin ................ G06F 16/381 |
| 2021/0165855 A1 | 6/2021 | Stuehler et al. |
| 2023/0073171 A1* | 3/2023 | Maggiore ............. H04W 4/029 |
| 2024/0046318 A1* | 2/2024 | Muriqi ................. G06Q 20/389 |

OTHER PUBLICATIONS

"Scaling Horizontally vs. Scaling Vertically", Retrieved from: https://www.section.io/blog/scaling-horizontally-vs-vertically, Retrieved Date: Jun. 10, 2023, 9 Pages.

* cited by examiner

*Primary Examiner* — Kavita Stanley
*Assistant Examiner* — Lin Lin M Htay
(74) *Attorney, Agent, or Firm* — Ray Quinney & Nebeker P.C.; James S. Bullough

(57) ABSTRACT

A method for managing localized resources displayable during execution of a software product includes receiving a localization build request from a source control platform. The localization build request specifies a unique resource identifier and a resource value for each of multiple displayable resources associated with execution of the software product in a default geographic locale. For each displayable resource, the method further includes determining a relevant recency timestamp based on a build timestamp of the localization build request and retrieving, based on the relevant recency timestamp for the displayable resource, at least one translated resource indexed in association with the relevant recency timestamp. The method still further includes adding the at least one translated resource to a localization build for the software product and returning the localization build to the source control platform.

17 Claims, 8 Drawing Sheets

CUMULATIVE LOCALIZATION ARCHITECTURE

BACKGROUND

Localization is the process of adapting content for presentation in a new region, including language translation, associated imagery, and/or cultural elements that influence how content will be perceived. Software products commonly provide users with the option to alter the display language for user interface elements displayed during execution of the code, such as text and/or graphic elements for buttons, menus, and other UI controls. Commonly, these types of displayable elements are developed, along with the source code, for presentation of GUI elements in a default geographic locale (e.g., an English-speaking locale). Following this initial development, the displayable elements are "localized" into translated counterparts configured for display in one or more other geographic locales. For example, English menu options such as "Save," "Rename," and "Print" are translated into Japanese, Chinese, French, German, etc.

Currently, software development and localization are disconnected processes. A software production platform handles the default-language resources and code, while translation data is stored in an external localization database. The software production platform is a complex system that uses version control and branching (e.g., development pertaining to different features of a same code product) to maintain aspects of software development, such as releases, product serving, feature development, and testing. One widely-used software production platform is Git, which supports both branching and version control extensively. This branching and version control functionality expedites and streamlines the development process by allowing teams developing different features of a same product and/or teams working on different versions of a same product to work within completely independent runtime environments.

In contrast to software production, localization is typically managed by a single centralized localization database that does not support versioning or branching. When a displayable resource is updated within the localization database, the old version of the resource is replaced with the new one. One consequence of this common architecture is that existing localization databases can only link to one branch of a product at a time. Stated differently, any updates to a localization database have the potentially to affect (and disrupt) the work of all teams performing localization from the same database. This creates a plethora of challenges pertaining to management of localized resources for software products having different features and/or versions managed by different development teams. Current solutions are heavily reliant on manual intervention with database data, creation of database "snapshots" (e.g., copies of the database), and/or complicated and unnatural workarounds. These existing solutions are needlessly wasteful in terms of storage space utilization and unnecessarily complicated, reducing overall efficiency of the code production process.

SUMMARY

According to one implementation, a localization system includes a cumulative localization database storing immutable time-stamped records corresponding to displayable resources accessed during execution of a software product. The system includes a resource record retriever that receives a unique resource identifier and a resource value for a displayable resource identified in a localization build request. In response, the resource record creator create a new resource record in cumulative localization database that includes the unique resource identifier, the resource value, and a build timestamp of the localization build request. The system further includes a translated resource retriever that requests a translation of the resource value corresponding to a locale specified in the localization build request. The translated resource retriever creates, in a translation table, a translation record that includes the translation, the unique resource identifier, and the build timestamp and adds the translated record to a localization build for the software product. The system outputs the localization build to a source control platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology includes a localization architecture that provides significant technical improvement over previous approaches to localization in terms of cost-efficiency, scalability, and reduced complexity for improved user experience. The proposed architecture includes a localization database structured to handle the complex resource needs of software production, such as by allowing different product teams to work with different versions of the same localization resource without making local copies of the localization database (e.g., database snapshots captured at different times). The disclosed approach natively supports versioning, branches, and product servicing. Additionally, the disclosed localization architecture ensures data integrity by prohibiting editing of resources in the localization database and by preserving metadata on all changes accessible for inspection.

Figure 1A:
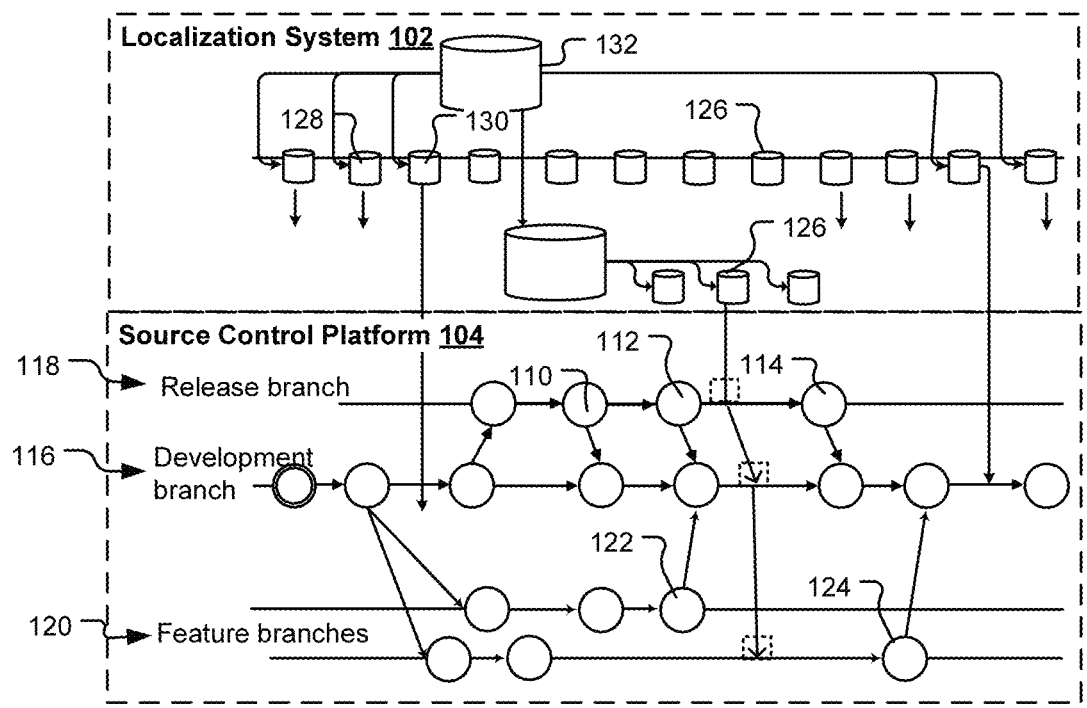
FIG. 1A illustrates example aspects of a localization system having a traditional architecture.
Figure 1B:
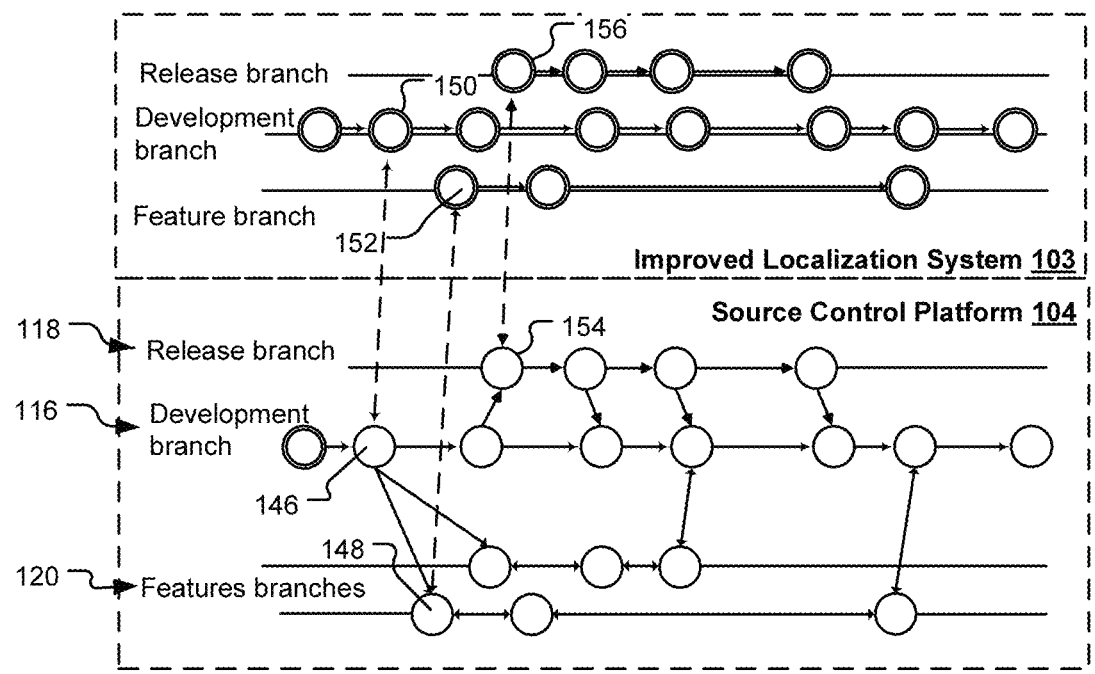
FIG. 1B illustrates example aspects of a localization system employing a cumulative localization database.

FIG. 1A illustrates example aspects of a localization system having a traditional architecture and FIG. 1B illustrates functional aspects of a cumulative localization architecture employing the herein-disclosed technology. These two figures are intended to provide a high-level overview of the functional advantages that can be realized by implementing the disclosed cumulative localization architecture.

The traditional architecture of FIG. 1A utilizes a localization system 102 with mutable records that change over time as updates are submitted. Data of the centralized localization database is pulled and utilized by different development teams working in parallel to perform different actions on source code being developed within a source control platform 104. The source control platform 104 provides features that facilitate storing and tracking changes in association for different versions of a code product. The source control system 104 supports branching, meaning that developers can create separate development "branches" to effectively isolate code changes from other teams working on developing different portions of the same software product.

The source control platform 104 illustrates an exemplary development pipeline that includes a development branch 116, a release branch 118, and various feature branches 120. Circles on each of branches (e.g., branches 116, 118, 120) represent different versions of a source code corresponding to the branch. For example, each circle on the development branch 116 represents a different version of a software product that underwent development, while each circle on the release branch 118 represents a different version of the software product that was eventually released. For example, circle 110 represents Microsoft Office 13, circle 112 represents Microsoft Office 14, circle 114 represents Microsoft Office 15, etc. Circles on the features branches 120 correspond to versions of different features within the code product. Different released version of the product (e.g., circles 110, 112, 114) include updates to different product features. For example, the circle 122 represents a product feature updated in a first release version corresponding to the circle 112 (e.g., Microsoft Office 14), while the circle 124 represents a different product feature update that is in-development for a not-yet released version of the code product.

The localization system 102 includes a localization database 132 that stores displayable resources. As used herein, a "displayable resource" refers to a data element that is called upon by source code and displayed to a user interface. For example, a displayable resource is a data element or collection of nested data elements that form some part of a user interface (e.g., an icon or selectable menu option including graphic elements and/or text). Displayable resources stored within the localization database 132 are mutable in the sense that an update to any one of displayable resources replaces a previously-existing version of the same resource. In FIG. 1A, database icons 126, 128, 130 represents modified versions of the localization database 132 at different points in time, where each modified version includes one or more new product resources or updates to previously-existing product resources that have replaced their former versions.

Without complex and cost-burdensome work-arounds typically employed by enterprises using the architecture of the localization system 102 of FIG. 1A, a modification to a displayable resource stored within the localization database 132 has the potential to undesirably impact many development teams at once. Assume, for example, a displayable resource corresponding to a UI menu item initially stores the string value "Home" and is subsequently changed to "Main Page." Since the translation of "Home" into various languages may not mean the same as the literal translation of "Main Page" in those same languages, it is common practice to re-localize the resource and obtain new translations as part of each update. Since the strings "Home" and "Main Page" are of different lengths (and their respective translations may also be of different lengths), these updates have the potential to cause unexpected and/or undesirable UI changes.

If all development teams for the code product were to always utilize the most current data in the localization database 132, the above types of updates have the potential to undesirably impact many development teams at once, potentially creating small bugs that escalate into large and complex problems for lower-level teams working with code that inherits attributes of code managed by higher-level teams. A common work-around to prevent the foregoing entails creating different copies of the localization system 102 for each different team to work with. That is, each team grabs a complete copy, referred to as a "snapshot", of the localization system 102 at a given point in time. The teams work with their respective snapshots-updating records and re-localizing records as needed.

In addition to needlessly wasting space with duplicating thousands of records in multiple places, the above-described "snapshot" practice creates further complications stemming from the need to eventually synchronized all of the teams' updates to the localization database 132 prior to release of the code product. Consequently, the different product branches periodically synchronize their respective localization database changes. Synchronization is, in some systems, achieved by propagating a localization request from the requesting team to the root (top-level) development branch, performing localization within the localization system 102 (e.g., the main copy of the localization database), and creating a new snapshot of the localization system 102 that is, in turn propagated down to each development team. In a typical scenario, one of these snapshots includes hundreds of thousands of records. Replicating and transmitting this data repeatedly is time-consuming and wasteful in the sense that the multiple versions of the localized database (corresponding to different points in time) are concurrently stored and used, even in scenarios where only a handful of the stored resources are altered between snapshots.

FIG. 1B illustrates an alternative infrastructure incorporating an improved localization system 103 with a single localization database (referred to herein as a cumulative localization database) concurrently accessed and updated by many different development teams. The cumulative localization database store immutable localization records that facilitate synchronization of localized displayable resources with versioning of source code supported by the source control platform 104. When a given displayable resource is modified within the localization database, the old version(s) of that resource are not modified or deleted. Rather, a new resource record is created for the resource, localization is performed to create corresponding new translations, and both the new resource record and the new corresponding translations are stored as immutable records for perpetuity. As used herein "immutable" means that the records are not, in the course of nominal database and/or localization system operations, changed or deleted.

According to one implementation, each record in the cumulative localization database includes a timestamp and a resource identifier. The resource identifier uniquely identifies a resource but not the resource content—that is, the resource identifier remains immutable as the content of the resource is updated. When a resource is updated, a new record is created for the resource. The new record includes the same resource identifier and a different (updated) timestamp along with other updated metadata discussed elsewhere herein. Each time a new resource record is created, localization is performed to create a set of translations corresponding to the updated resource content. Each translation is stored as a different record with a timestamp that matches the timestamp of the corresponding new resource record.

One consequence of the above-described architecture (e.g., storing immutable records) is that each different branch of a code product can independently update resources stored within localization database without impacting previous records corresponding to the same resources. The timestamping of the different records effectively allows different teams to utilize select versions of the display resources that are guaranteed to remain unchanged.

As shown in FIG. 1B, a first version of code on development branch 146 performs testing and development using a first set of localized displayable resources 150 while a feature branch 148 (e.g., a subbranch of the development branch 146) performs testing and development using a second set of localized displayable resources 152. The first set of localized displayable resources 150 and the second set of localized displayable resources 152 may be partially and/or largely overlapping (e.g., two hundred thousand identical records with fewer than 100 records that are modified); yet, all versions of the different respective resources and their respective localized (translated) counterparts are stored within the same localization database. This branch and version support offered by the improved localization system 103 allows development teams to work independently (e.g., without introducing database changes that impact other teams) without the complication and waste of creating a copy of the entire localization system for each different team to work with.

By example, a released version of the code product 154 is packaged for customer distribution with a third set of resources 156. The third set of resources 156 includes a complete collection of the resources utilized by the source code for the code product 154. In the event that different feature branch teams built and tested GUI features using different versions of a same displayable resource, the third set of resources 156 packaged with the end product includes both versions of the resource for respective use by the corresponding branches in the source code.

Beneficially, the above-described cumulative localization database architecture natively supports version control and branching that integrates with the standard software development process allowing each different development branches of a code product to utilize and independently update a respective subset of the resources in the localization database without impacting the work of other development teams building and testing other versions of the same product and/or different versions of different features of the product.

The records in the cumulative localization database are immutable and have timestamps, which enable versioning to service the independent needs of different product branches. This eliminates the need for capture, distribution, and preservation of multiple "snapshots" of the localization database (many of which include high numbers of duplicative records), significantly reducing overhead pertaining to data storage and transfer. Additionally, since each branch can independently add records to the localization database and utilize select different versions of the same records, localization requests do not bottleneck the system (e.g., by causing all branches to wait for new data when a localization request is placed with the main copy of the localization system).

Figure 2:
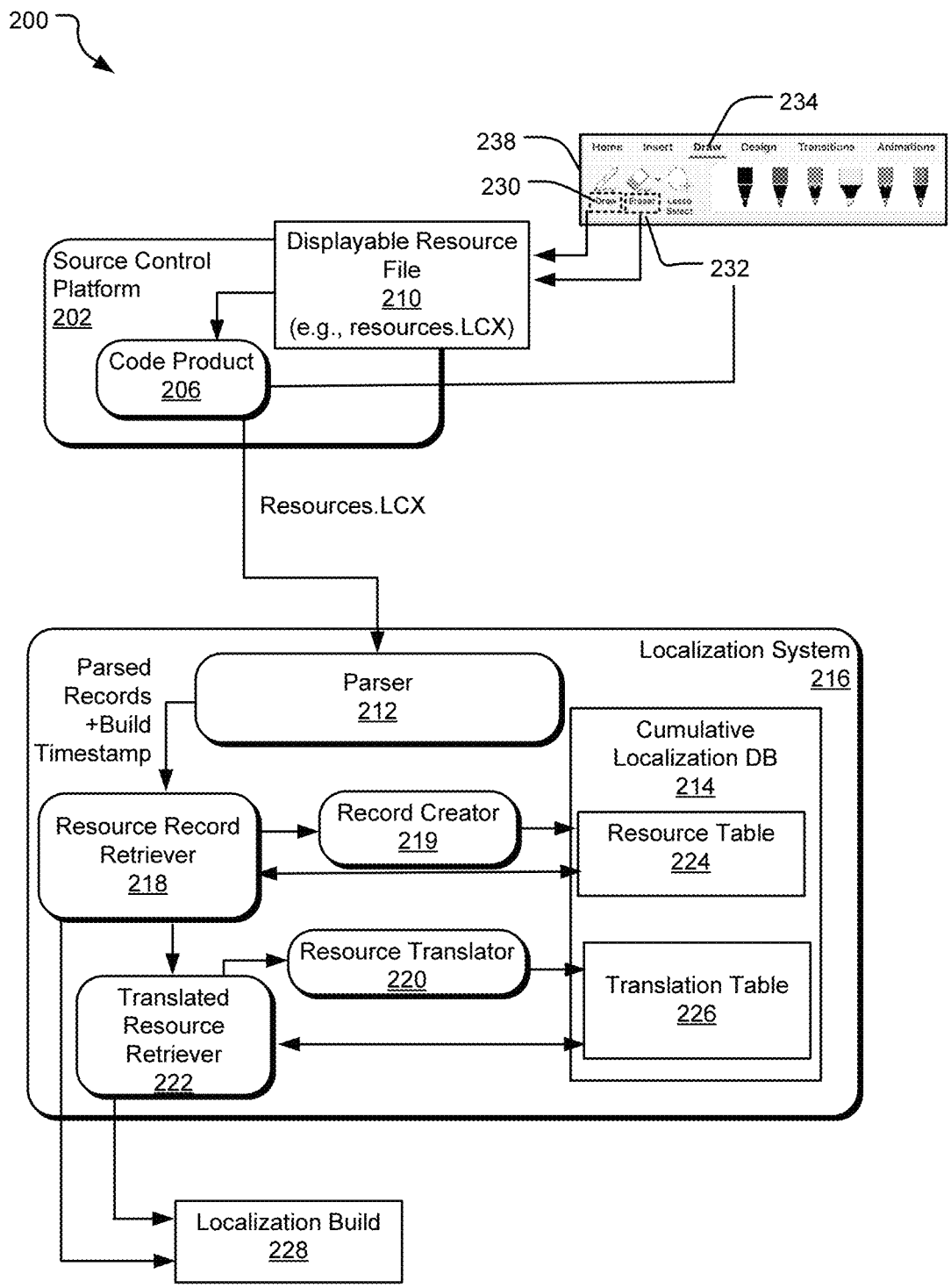
FIG. 2 illustrates example actions for retrieving and creating localization data within a localization system including a cumulative localization database.

FIG. 2 illustrates example actions for retrieving and creating localization data (e.g., creating a "localization build") for a code product 206 within a localization system 200 that implements a cumulative localization database 214. The code product 206 is developed within a source control platform 202 that supports version control and branching. In various implementations, the code product 206 is a stand-alone application or a subset of an application responsible for one or more application features (e.g., a feature branch). When executed, the code product 206 generates and presents a graphical user interface (GUI) that serves content to a user including a variety of displayable resources. By example, a GUI menu 238 shows displayable resources 230, 232, 234 that each correspond to a different graphic and/or textual elements, such as drop-down menu option or selectable icon called upon during execution of the code product 206. Although not shown, the displayable resources presented by the application may include some non-interactive displayable resources as well, such as instructional content (e.g., text files), template information, etc.

The various displayable resources 230, 232, 234 of the code product 206 are defined, along with associated metadata, in one or more files, such as a displayable resource file 210, which may be understood as storing at least a name defining each different displayable resource and a resource value for the displayable resource that includes the corresponding content populated on the GUI menu 228. In one implementation, the value for each of the displayable resources 230, 232, 234 includes a text string. In another implementation, the value includes graphical information such as shape and color information, either alone or in addition to textual information. In various implementations, the displayable resource file 210 assumes different forms. By example, the displayable resource file 210 may be an XML or XML-like document that defines the displayable resources in a nested or tree-like structure.

At one or more points in time during development of the code product 206, a developer of the code product 206 request "localization" of the displayable resource file 210. A used herein, localization refers to the process of adapting content for presentation in a new geographic locale different from the default geographic locale that the content is initially developed for presentation in. This adaptation typically includes translation of textual elements into one or more alternate languages.

To request localization of the displayable resources defined within the displayable resource file 210, the developer (or source control platform 202) places a request with the localization system 216. In the implementation shown, the displayable resource file 210 is submitted to the localization system 216 as an input of the request. The displayable resource file 210 is received by a parser that splits the raw data in the displayable resource file 210 into individual records that include a single displayable element and its associated metadata. Each of the individual record parsed from the displayable resource file includes at least a resource identifier as well as a value field defining the corresponding content that is displayed. The resource identifier uniquely identifies the resource by name and the value field defines the corresponding content that is displayed. Notably, the resource identifier remains fixed even while the value of the resource is modified.

In addition to the above, each of the parsed records output by the parser 212 also includes a build timestamp. In one implementation, the build timestamp is sent by a client device as part of the localization request. The build timestamp may, for example, correspond to a time of the build request and/or time that is documented within the source control platform 202 in association with the code product 206. For example, the build timestamp corresponds to a most recent update to the code product 206 in a version control system rather than the actual time of the build request.

Depending upon the structure of the displayable resource file 210, the parsed records may include other information as well. In one implementation, each of the parsed records includes a parent identifier that identifies another record containing the current record as a child in a tree structure. In another implementation, each of the parsed records includes a cargo field that contains all attributes of the resources and the value of the resource (e.g., a node within a tree-like structure).

Each of the records parsed from the displayable resource file 210 is provided as input to a resource record retriever 218 that, in turn, queries a resource table 224 with the resource identifier and build timestamp of each parsed record. From this query, the resource record retriever 218 determines whether the cumulative localization database 214 already includes a record for the resource (e.g., a record with the same resource identifier). In one implementation, the resource record retriever 218 queries the resource table 224 for relevant records over a time interval proceeding the build timestamp with an end that matches or that is otherwise determined based on the build timestamp each of the parsed records.

If the resource table 224 does not already include a record associated with the resource identifier, a record creator 219 creates a new record in the resource table 224 based on the parsed record and assigns the record a timestamp that equal to or otherwise based on the build timestamp of the localization request. This timestamp is used as the "relevant recency timestamp" for the resource—the purpose of which is discussed further below.

If, on the other hand, the resource table 224 does already include one or more records for the resource identifier, the resource record retriever 218 identifies and selects a newest-in-time in matching record that precedes the build timestamp. For this select record, the resource record retriever 218 determines whether value (e.g., resource content) of the existing record matches that of the parsed record. If the value of the parsed record does not match the select record, the record creator 218 creates a new record in the resource table 224 based on the parsed record and assigns the record a timestamp that equals or is otherwise based on the build timestamp, as described above. This timestamp is used as the "relevant recency timestamp" for the resource.

If, on the other hand, the value of the parsed record does match the select record, no new record is created in the resource table 224 and the timestamp of the select record is used as the relevant recency timestamp for the resource.

A translated resource retriever 222 performs actions for retrieving translated (localized) records corresponding to each of the parsed records. This translation retrieval and/or creation is performed based on the resource identifier and relevant recency timestamp of each of the parsed record (as set for the above) in addition to a set of requested locales that are, in one implementation, specified in the initial build request and/or in the displayable resource file 210. The translated resource retriever 222 queries a translation table 226 with the resource identifier and relevant recency timestamp of each of the parsed records, as well as a designated list of locales of interest for the record. If the translated records for the requested locales are already stored in association with the relevant recency timestamp and resource identifier, these translated records are retrieved and added to a localization build 228 along with the corresponding parsed record that the translation query was based on (e.g., the English version of the record).

If there is no translated record currently stored in association with the relevant recency timestamp and resource identifier for one or more of the requested locales, a resource translator 220 translates the parsed resource (e.g., employing various machine learning models and translation logic) for the request locale(s) to create a set of translation records that are then stored in the translation table 226 in association with the relevant recency timestamp and resource identifier of the corresponding parsed record. These newly-created translations are added to the localization build 228 along with the corresponding English-version record.

The localization system 216 outputs the localization build 228, which includes each of the resources in the displayable resource file 210 with values configured for output in a first default locale (e.g., an English-speaking locale) as well as corresponding translated values for these resources in each of the requested locales.

Figure 3:
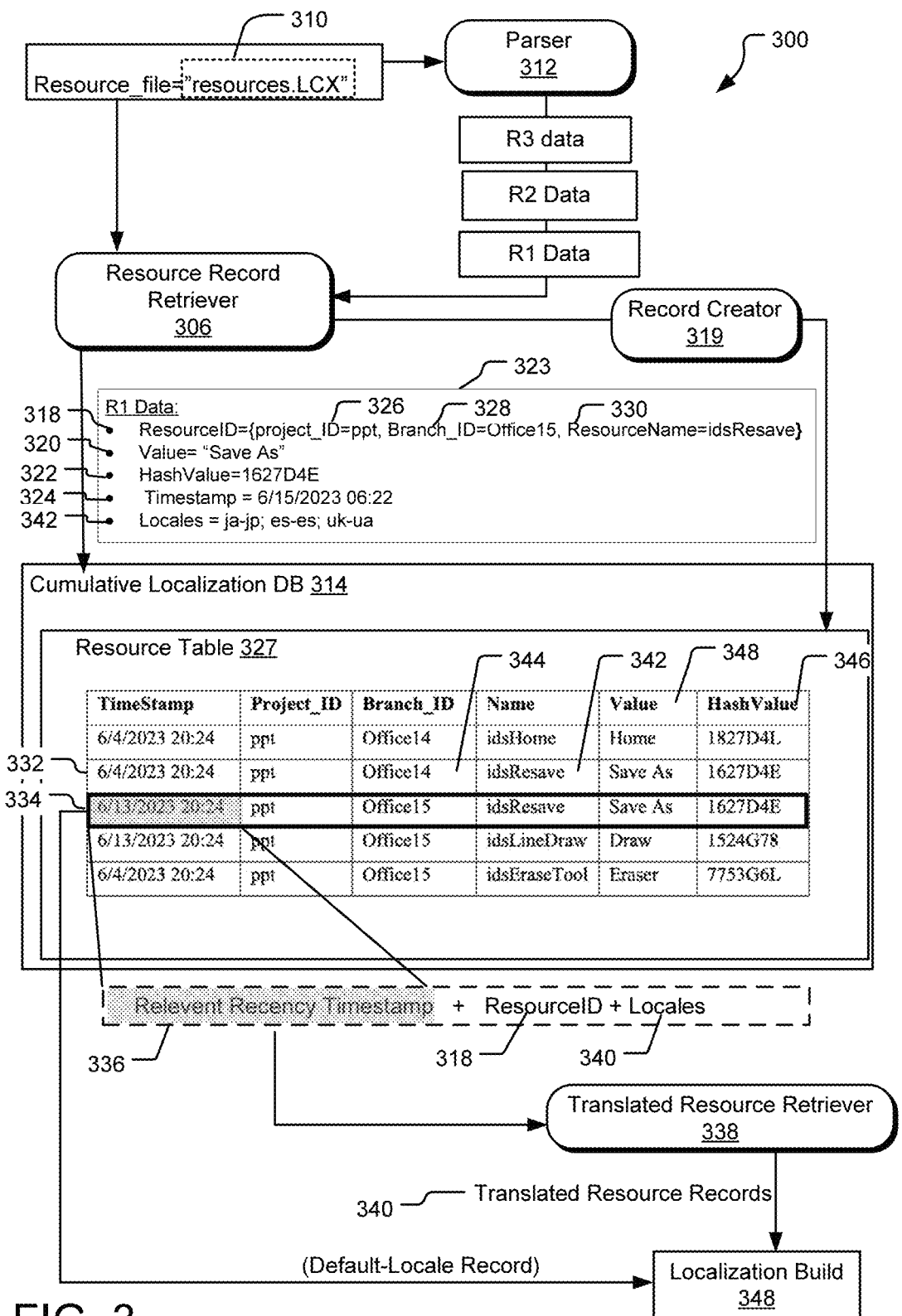
FIG. 3 illustrates example operations of a localization system including a cumulative localization database.

FIG. 3 illustrates further example operations 300 of a localization system performed in response to receiving a localization build request. As used herein, a localization build request is a request placed—e.g., by a developer or source control platform—to generate a "localization build" that is, essentially, a bundle of displayable resources called upon by a source code product. A localization build typically includes a same set of displayable resources configured for display in at least two geographic locales. For example, localization build include strings that are in a language of a default geographic local (e.g., English-language strings) and the same strings translated into one or more additional languages.

The localization build request specifies a displayable resource file 310 including raw data for each of various displayable resources called by a code product. For each of the displayable resources, the displayable resource file 310 includes raw data identifying a corresponding unique resource identifier and a resource value that stores the presentable content of the resource in a format associated with presentation in a default locale (e.g., an English-speaking locale).

In response to receipt of the localization build request at the localization system 300, the displayable resource file 310 is provided as input to a parser 312. The parser 312 reads the raw data of the displayable resource file 310 and splits this data into individual "records" (e.g., R1 data, R2 data, R3 data, each corresponding to a single displayable resource). Each of these records is populated with data parsed from the displayable resource file 310 and then input, sequentially, to a resource record retriever 306.

In FIG. 3, a parsed record 323 illustrates exemplary information included in each record that is output by the parser 312. This information includes a unique resource identifier 318, a resource value 320, a hash value 322, a build timestamp 324, and a list of locale(s) of interest 342. Each of these fields is briefly described below.

In general, the unique resource identifier 318 is an identifier that uniquely identifies the associated displayable resource within a source control platform. This identifier is, for example, unique within an extensive pool of displayable resources used across multiple teams working on different projects all managed within the source control platform also across different branches of the particular product that the displayable resource pertain to. By example, the unique resource identifier 318 is shown to include a project identifier 326, a branch identifier 328, and a resource name 330. The project identifier 326 is an example of a namespace that may apply to a number of different teams working on different versions of a code product. For example, there may be several development teams working on features for the application "Microsoft PowerPoint" (identified by project id "ppt"). The branch identifier 328 is an example of an identifier associated with a given namespace (e.g., project id), that applies to team(s) working on code associated with a single version of the product (e.g., Microsoft Office15). Some resource identifiers may not include the branch identifier 328. For example, the branch identifier 328 is excluded for some displayable resources developed at the root level for use used by many or all lower branches of a code product.

The resource name 330 is a name that is assigned to the displayable resource, such as a developer-assigned description name or a default name generated by the source control platform at the time the displayable resource is initially defined.

The resource value 320 stores the value of the associated displayable resource (the resource value). In the example shown, the value is a simple string with the English words "Save As." In other examples and implementations, the value may be shorter, longer, or of other (e.g., non-string) forms.

The hash value 322 is a mathematically-created unique identifier usable to identify the value of the associated record. For example, the hash value 322 is a hash encoding the resource value 320-a string: "Save As." The hash value 322 is generated via any known hashing methodology and is typically represented as a smaller number of total bits as compared to the corresponding value being represented.

The build timestamp 324 of the parsed record 323 identifies a timestamp associated with the localization build request. In one implementation, the build timestamp 324 indicates a time that the localization build request is placed; in other implementations, the build timestamp 324 matches a stored timestamp corresponding a last update to a code product version in a version control system that is selectively presents the displayable resources defined within the displayable resource file 310. In still another implementation, the build timestamp 324 is a timestamp that is explicitly specified in the build request, such as a timestamp corresponding to a time period of interest to a developer. In another implementation, the build timestamp 324 reflects a build time of the displayable resource file (e.g., a timestamp identifying when the displayable resource file 310 was created).

The list of locales of interest 342 includes one or more geographical locales of interest that are different from the default geographic locale of the displayable resource file 310.

For each record received as input, the resource record retriever 306 initiates a query to identify whether the identified record already exists within a resource table 327 of the cumulative localization database 314. The resource table 327 is to be understood as comprising localization records configured for display in the default locale (e.g., an English-speaking locale). In the example shown, the resource record retriever 306 queries the resource table 327 based on the unique resource identifier 318 of the parsed record 323 and the build timestamp 324 of the parsed record 323.

In one implementation, the above-described query is formulated to return all records matching the unique resource identifier 318 and the resource value 320 of the parsed record 323 that are created during a time interval having an end that matches or that is otherwise defined based on the build timestamp 324 of the build request.

In one implementation, the unique resource identifier of a stored record is identified as "matching" the unique resource identifier 318 of the parsed record 323 when either (1) all components of the unique resource identifier 318 match that of the stored record (e.g., project identifier, branch identifier, and resource name) OR (2) the project identifier and resource name of the unique resource identifier 318 match the stored record, and the stored record does not have a branch identifier (e.g., the branch ID is null).

In the illustrated example, the build timestamp 324 is "6/15/2023 06:22" and the query returns all records matching the unique resource identifier 318 that were created at or prior to this time. The resource table 327 stores two records 332, 334 indexed in association with the same project id and resource name as the parsed record 323. Notably, the record 332 is indexed in association with a different branch identifier 344 ("Office 14") than the branch identifier 328 in the parsed record 323. Therefore, the record 332 is not returned in the query. However, the record 334 is returned since it includes the same resource name ("idsResave"), project identifier ("ppt"), and branch identifier ("Office15") as the parsed record 323.

In this example, the record 334 is the sole matching record returned in the query and is therefore identified as the relevant default-locale record for the displayable resource. In some implementations, the resource record retriever 306 performs additional operations to verify that the value of the parsed record 323 matches the value of the stored record. For example, the hash value 322 of the parsed record 323 is compared to a stored hash value 346 within the record 334. Confirming that the hash values match ensures the existing record corresponds to a same version of the record. Still other implementations may utilize hashes to capture file metadata, such as a "comment hash" based on and usable to uniquely identify comments stored in association with a displayable resource. For example, the resource record retriever 306 verifies the value matches by ensuring ensure that both the hash value 322 and hash comment (not shown) fields of an identified existing table record match that in the corresponding parsed record 323.

Once a single record has been identified as the relevant default-locale record corresponding to the parsed record 323 (e.g., as described above), the resource record retriever 306 temporarily stores a timestamp of the relevant default-locale record (e.g., "Jun. 13, 2023 20:34") as the "relevant recency timestamp 336" for the associated displayable resource. The relevant recency timestamp 336 is key in subsequent operations pertaining to obtaining corresponding translations, as is discussed further below.

In some queries, the unique resource identifier 318 of the parsed record 323 corresponds to two or more existing records in the resource table 327. This is the case when the value of the displayable resource is updated by a given team. For example, a "PowerPoint" development team working on version "Office15" updates the resource value 320 of the displayable resource from "ReName" to "Save As" and, in doing so, creates a new record with an updated timestamp in the resource table 327 without deleting an older version of the record. In this scenario where multiple records match the unique resource identifier 318, the timestamps in the resource table 327 are used to identify the relevant default-locale record from among those matching the unique resource identifier 318. For example, the resource record retriever 306 identifies a newest-in-time record that precedes that of the build timestamp 324 as the relevant default-locale record. The hash value of the this is, in some implementations, compared to the hash value 322 of the parsed record 323 to further confirm accuracy of the match.

If the resource table 327 does not store any records matching both the unique resource identifier 318 and the resource value 320 of the parsed record 323, record creator 319 creates a new record in the resource table 327 that includes data of the parsed record 323 that has been parsed from the displayable resource file 310. This newly-created record is stored in the resource table 327 with a timestamp that matches the build timestamp 324 (or that is otherwise based on the build timestamp 324). The resource record retriever 306 uses this new record as the relevant default-locale record and temporarily stores the build timestamp 324 as the relevant recency timestamp 336 for the displayable resource.

The identified or newly-created relevant default-locale record corresponding to each parsed record is added to a localization build 348, which is to be understood as including a bundle of displayable resources called upon by the associated code product.

In summary, the resource record retriever 306 identifies a relevant default-locale record for each parsed recorded that it receives as input. This relevant default-locale record is either a recycled (matching) existing record or a newly created record. The timestamp of this relevant default-locale record is temporarily stored (as the relevant recency timestamp 336) and used to obtain a set of translated records corresponding to the relevant default-locale record.

In one implementation, the relevant recency timestamp 336 for each displayable resource is passed, along with the unique resource identifier 318 and the locales of interest 342 to a translated resource retriever 338. The translated resource retriever 338 identifies or creates (if not already existing) a corresponding set of translated resources 340.

Figure 4:
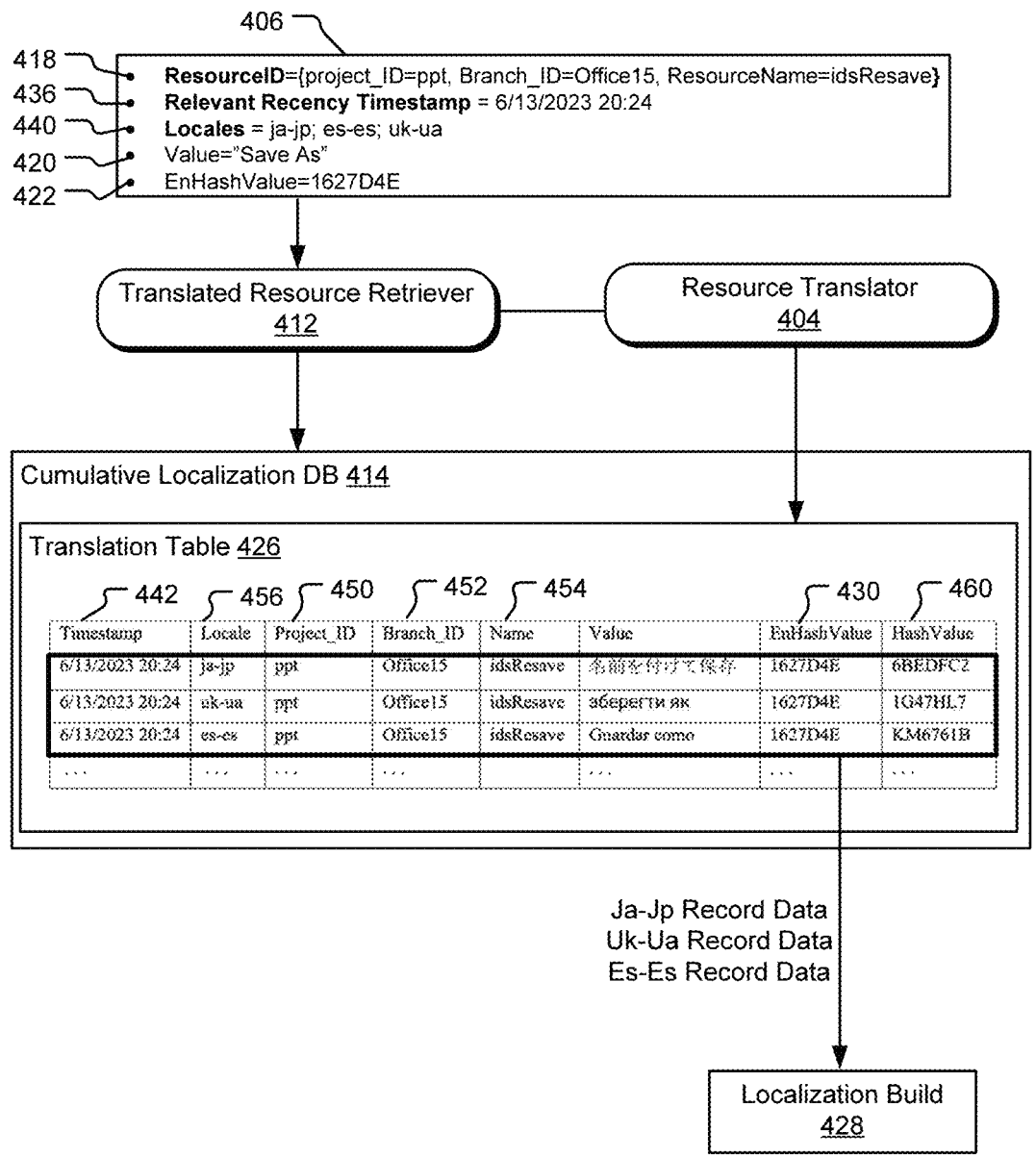
FIG. 4 illustrates further example operations of a localization system including a cumulative localization database.

FIG. 4 illustrates further example operations 400 of a localization system performed in response to receiving a localization build request. Specifically, FIG. 4 illustrates a translated resource retriever 402 and a resource translator 404 that perform actions for obtaining translated records (e.g., newly-created records or recycled existing records) corresponding to each displayable resource named in a localization build request (e.g., within the displayable resource file 310 of FIG. 3). In one implementation, the localization system 400 further includes some or all components shown and described with respect to either of FIG. 2 and FIG. 3.

As input, the translated resource retriever 402 receives data of a default locale record 406 extracted from a resource table (not shown) of a cumulative localization database 414. The default locale record 406 represents the "relevant record" that is identified for given displayable resource via the operations described with respect to FIG. 3.

In FIG. 4, the default locale record 406 includes a unique resource identifier 418, a relevant recency timestamp 436, a list of locales of interest 440, a resource value 420, and a hash value 422 that encodes the resource value 420. In one implementation, the unique resource identifier 418 includes the same or similar subcomponents as those described with respect to the unique resource identifier 318 of FIG. 3. The relevant recency timestamp 436 is a timestamp for a corresponding relevant record identified as described above with respect to FIG. 3. The list of locales of interest 440 identifies a one or more geographical locales that the displayable resource is to be configured for presentation in (e.g., locales specified as inputs to the localization build request). The resource value 420 includes displayable content associated with a default geographic locale (e.g., an English-language string associated with an English-speaking locale). In FIG. 4, the annotation "EnHash Value" is used to denote the fact that the hash value 322 encodes the English-language value of the resource, as compared to other hashes (hash value 460) included in a translation table 426 that encode a corresponding translated value (e.g., value 462) of the resource.

Each record stored in the translation table has a timestamp 442 that is, upon creation of the record, set to match the relevant recency timestamp 436 of the corresponding relevant record (e.g., default locale record) that the translation is derived from.

The translated resource retriever 402 queries a translation table 412 with some or all of the corresponding default locale record 406. For example, the query specifies at least the unique resource identifier 418, the relevant recency timestamp 436, and the locale(s) of interest 440. In response to this query, the translated resource retriever 412 receives records from the translation table 426 that match the specified inputs.

In one implementation, an existing translated record is "recycled"-meaning, added to a localization build 428— when both the unique resource identifier 418 and the relevant recency timestamp 436 of the default locale record 406 match that of the stored translated record for one of the specified locales of interest 440. If both of these fields do not match exactly, a resource translator 404 creates and stores a new translated record based on the default locale record 406, such as by using translation tools and methods readily available in the art. This newly-created record is added to the translation table 426 and the timestamp 442 for the new record is set to equal that of the relevant recency timestamp 436 for the record of interest.

Due to the systematic matching of the timestamp 442 of each translated record to the relevant recency timestamp 436 of the corresponding default-locale record (e.g., a record storing the English version of the same resource), the relevant recency timestamp 436 is a key piece of information that can be leveraged to determine whether a translated record is an accurate translation of the value stored in the default locale record 406. When a translated record in the translation table 426 includes a timestamp and a unique resource identifier that match the relevant recency timestamp 436 and the unique resource identifier 418 in the default locale record 406, this means that the translated record was derived from the default locale record 406.

In some implementations, the translated resource retriever 412 performs additional verification of a translated record by confirming that the hash value 422 (e.g., EnHash Value) of the default locale record 406 matches that of a corresponding hash value 430 of the translated record. This match confirmation further guarantees, with absolutely certainty, that the stored translated record is derived from the default locale record 406.

For each of the locale(s) of interest 440 included the default locale record 406, a matching translated record is either recycled or newly-created as described above. These matching records are then added to the localization build 428. After the localization build 428 is updated to include the default-locale version and corresponding translations of interest for each resource identified the localization build request, the localization build 428 is output to a source control platform. The localization build 428 is, in some implementations, added to a downloadable package provided to an end user in association with the software product. For example, the localization builds created by each of multiple different teams can be merged and deduplicated into a final localization build (and/or a final localization build can be run for the entire product at once, specifying multiple different displayable resource files as input for each of multiple branches of the corresponding code product). The localization build for the final version of the software product is either distributed with the software product or made available for download from a centralized (e.g., online) repository. For example, the code product is configured to download the appropriate localization build during initial installation or nominal execution on a user machine.

Notably, the localization build 428 is branch specific (e.g., for different versions of a code product and/or different features of the code product), meaning that different development teams can actively add resources to and pull resources from the cumulative localization database 414 without altering resources that the other development team(s) are relying on. This eliminates the need to have redundant "snapshot" copies of the localization database available for each different team to work with in isolation. The above is realized, in part, by the usage of the herein-described unique resource identifiers in combination with the disclosed time-stamping scheme that (1) that ensures each default-locale record has a timestamp that is based on one specified in a corresponding initial build request; and (2) each translated record has a timestamp that matches the timestamp of the default-locale record that it is derived from.

Figure 5A:
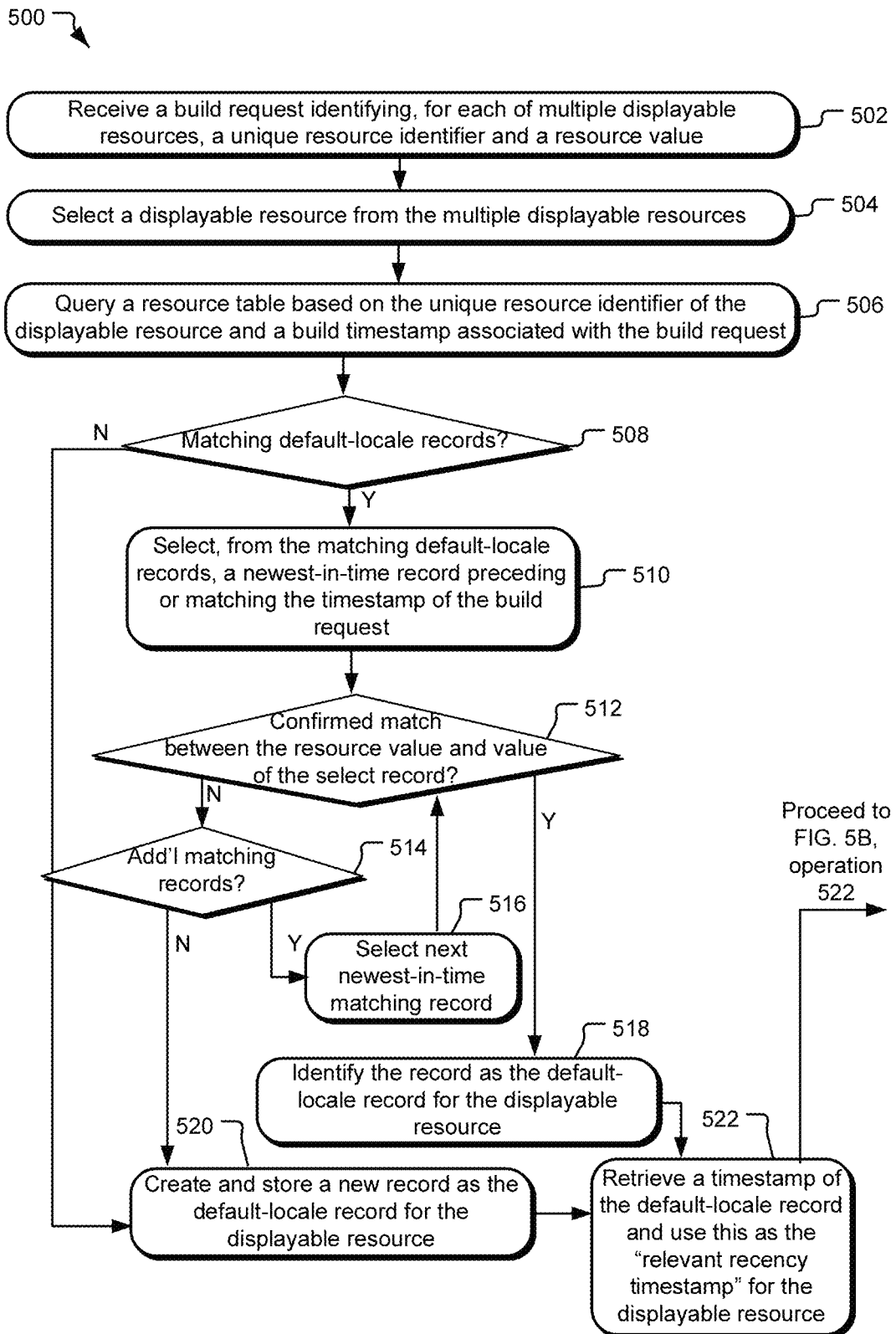
FIG. 5A illustrates example operations for performing a localization build utilizing a cumulative localization database.

FIG. 5A illustrates example operations 500 for performing a localization build utilizing a cumulative localization database. A receiving operation 502 receives a build request that identifies, for each of multiple displayable resources, a resource identifier and a resource value. A selection operation 504 selects a displayable resource from the multiple displayable resources. In some implementations, the selection operation 504 entails parsing a displayable resource file into individual parsed records that each correspond to one of the displayable resources identified in the displayable resource file (e.g., as described with respect to FIG. 3). A first one of the parsed records is selected.

A querying operation 506 queries a resource table of the cumulative localization database based on the unique resource identifier of the selectable displayable resource and a build timestamp associated with the build request. In various implementations, the build timestamp corresponds to a timestamp of the build request, a versioning timestamp associated with particular version of source code associated with the requested build, a creation timestamp of a displayable resource file provided as input to the build request, a developer-specified input to the build request, or other timestamp, such as the further example build timestamps discussed herein with respect to FIG. 3.

A matching operation 508 determines whether the resource table includes one or more default-locale records that match the criteria specified by the querying operation 506. For example the matching operation 508 determines whether the resource table stores one or more existing records that have the same unique resource identifier and a timestamp that precedes or matches the build timestamp associated with the build request. If the matching operation 508 determines that one or more matching default-locale records do exist, a selection operation 510 selects, from the matching records, a newest-in-time record that precedes or matches the timestamp of the build request. Following the selection operation 510, a verification operation 512 confirms whether or not a resource value of the selected record matches the resource value of the displayable record.

If not, a determination operation 514 determines whether there exist other matching records and, if so, a selection operation 516 selects a next newest-in-time matching record that precedes the timestamp of the build request. In this flow, the verification operation 512, determination operation 514, and selection operation 516 are repeated as described above until the verification operation 512 confirms a match between the resource value of the selected record and the resource value of the displayable record.

Once the verification operation 512 confirms that the stored value of the selected record matches the resource value of the displayable record, a storing operation 518 stores the record as the default-locale record for the displayable resource.

If, on the other hand, either (1) the verification operation 512 fails to confirm a match of the displayable resource's resource value with a stored value of any record returned in the query or (2) the matching operation 508 finds that the resource table does not store any default-locale records matching the initial criteria specified by the querying operation 506, a record creation operation 520 creates a stores a new record in the resource table. This new record includes a timestamp that matches or that is otherwise based on (derivable from) the build timestamp of the build request. This newly-created record is identified as the default-locale record for the displayable resource.

A retrieval operation 522 retrieves a timestamp of the default-locale record and uses this timestamp as the "relevant recency timestamp" for the displayable resource. Following the retrieval operation 522 the operations 500 proceed to operation 524 of FIG. 5B.

Figure 5B:
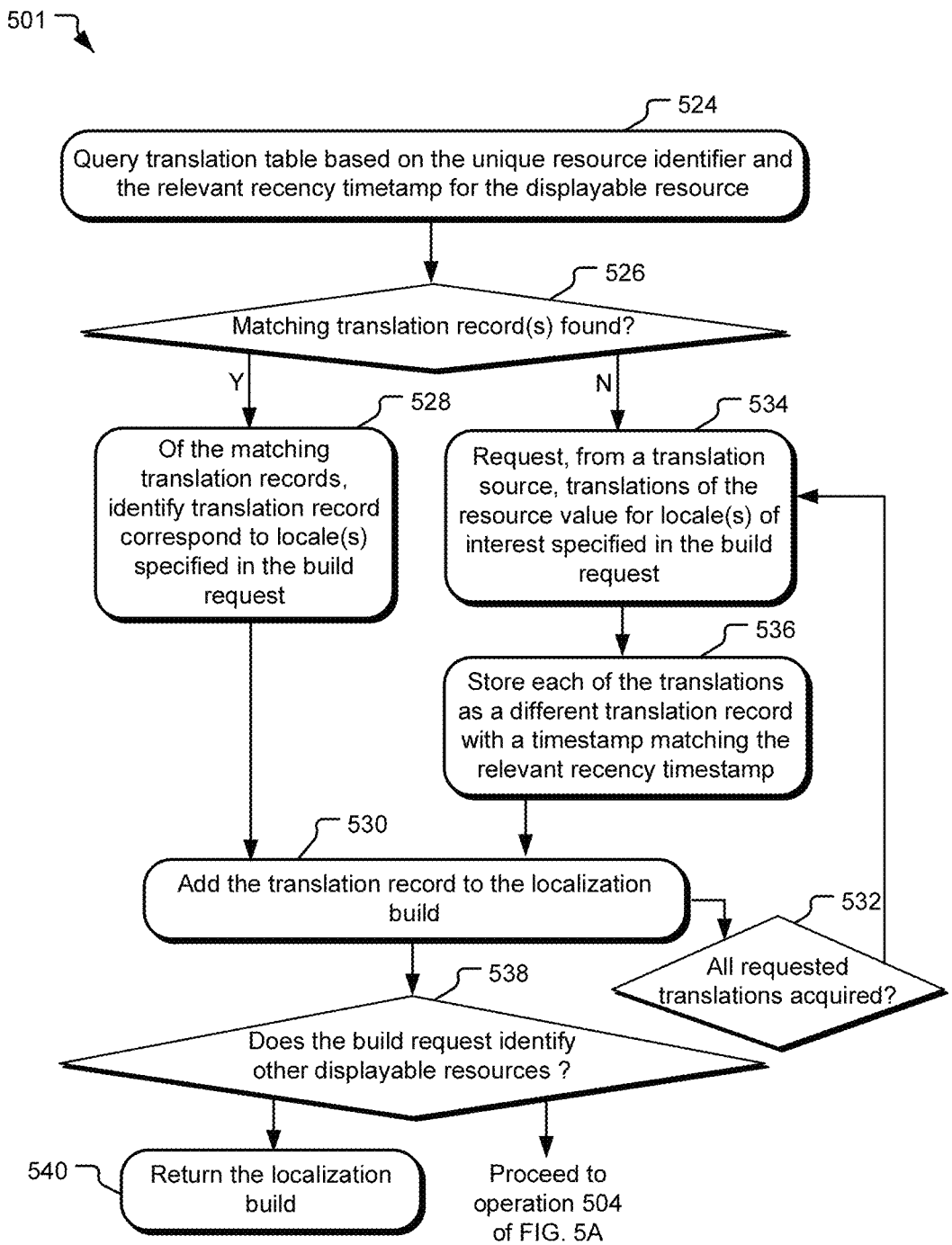
FIG. 5B illustrates additional example operations for performing a localization build utilizing a cumulative localization database.

FIG. 5B illustrates further example operations 501 for performing a localization build utilizing a cumulative localization database. In one implementation, the example operations 501 are performed following the example operations 500 described with respect to FIG. 5A.

The operations 501 being with a querying operation 524 that queries a translation table of the cumulative localization database based on the unique resource identifier and the relevant recency timestamp for the default-locale record corresponding to the selected displayable resource. For example, the querying operation requests records in the translation table that have the same unique resource identifier as the default-locale record and a timestamp that matches the relevant recency timestamp of the default-locale record.

A matching operation 526 determines whether matching records are returned by the query operation. In one implementation, a returned record is identified as "matching" the criteria of the query operation 524 if the record stores a hash value encoding the resource value of the default-locale record. In scenarios where one or more matching translations records are identified, an identification operation 528 then identifies a subset of the identified matching translation records that correspond to locale(s) specified in the build request. A build operation 530 adds these records to the localization build.

A determination operation 532 next determines whether translation records have been acquired for all locales of interest identified in the build request. If either (1) a translation record is not-yet-acquired for one or more of the locales or (2) the matching operation 526 does not identify any matches to the criteria specified in the query operation 524, a translation request operation 534 requests, from a translation source, a translation of the resource value for each of the not-yet acquired locales of interest specified in the build request. A storing operation 536 stores each of the newly-generated translations as a different translation record including both (1) a timestamp that matches the relevant recency timestamp of the default-locale record an (2) a resource identifier that matches the unique resource identifier of the default-locale record. In some implementation, the newly-created translation records each additionally store a hash value encoding the resource value that was translated in order to create the record. The build operation 520 adds these newly-generated translation records to the localization build.

A determination operation 538 determines whether the build request identified other displayable resources not yet added to the localization build. If so, the operations 501 proceed to back to the selection operation 504 of FIG. 5A. If not, an output operation 540 outputs the localization build.

Figure 6:
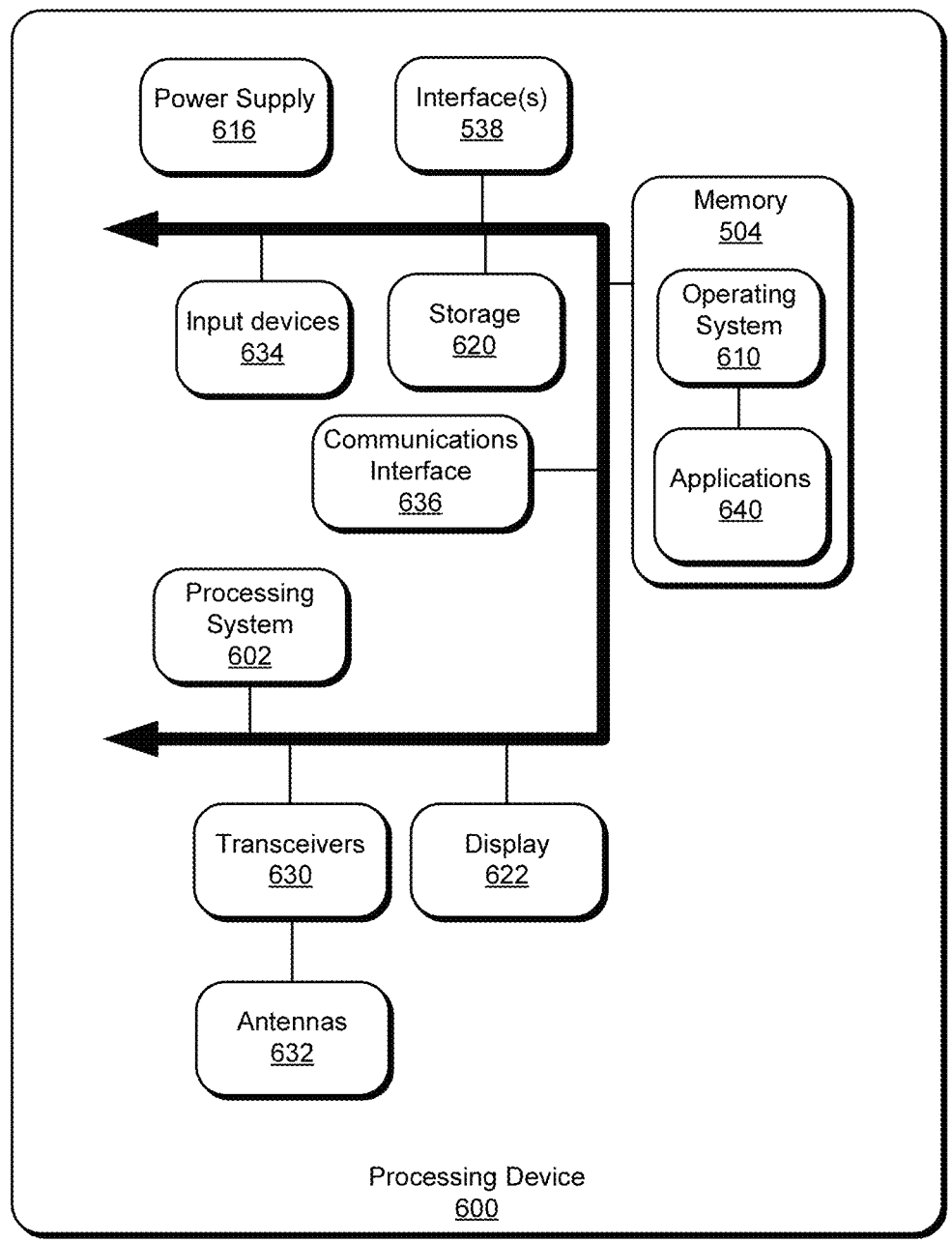
FIG. 6 illustrates an example schematic of a processing device 600 suitable for implementing aspects of the disclosed technology.

FIG. 6 illustrates an example schematic of a processing device 600 suitable for implementing aspects of the disclosed technology. The processing devices 600 includes one or more processor unit(s) 602, memory device(s) 604, a display 606, and other interfaces 608 (e.g., buttons). The processor unit(s) 602 may each include one or more CPUs, GPUs, etc.

The memory device(s) 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory device(s) 604 and is executable by the processor unit(s) 1002, although it should be understood that other operating systems may be employed.

One or more applications 612 (e.g., the improved localization system 103 and/or the source control platform 104 of FIG. 1B) are loaded in the memory device(s) 604 and executed on the operating system 610 by the processor unit(s) 602. The applications 612 may receive inputs from one another as well as from various input local devices such as a microphone 634, input accessory 635 (e.g., keypad, mouse, stylus, touchpad, gamepad, racing wheel, joystick), and a camera 632. Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a system for managing localized resources displayable during execution of a software product. The system includes: a cumulative localization database storing immutable time-stamped records corresponding to displayable resources accessed during execution of a software product. The system further includes a resource record retriever stored in memory that is executable to receive, for a displayable resource identified in a localization build request, a unique resource identifier and a resource value and to create an immutable record in the cumulative localization database that includes the unique resource identifier, the resource value, and a build timestamp of the localization build request. The system still further includes a translated resource retriever stored in memory and executable to: request a translation of the resource value corresponding to a geographic locale specified in the localization build request; create, within a translation table of the cumulative localization database, a translation record that includes the translation, the unique resource identifier, and the build timestamp; and add the translated record to a localization build for the software product, wherein the system outputs the localization build to a source control platform.

In some aspects, the techniques described herein relate to a system wherein the unique resource identifier includes a resource name, a project identifier, and a branch identifier.

In some aspects, the techniques described herein relate to a system, wherein the build timestamp corresponds to a versioning timestamp associated with a version of source code for the software product stored within the source control platform.

In some aspects, the techniques described herein relate to a system, wherein the resource record retriever is further configured to: query a resource table of the cumulative localization database for records within a time interval having an end defined based on the build timestamp of the localization build request; and in response to determining that the resource table does not include a record indexed in association with the unique resource identifier, create the translation record.

In some aspects, the techniques described herein relate to a system, wherein the displayable resource is one of multiple displayable resources identified within a data file provided as an input to the localization build request and the system is further configured to create a separate default-locale record in the cumulative localization database for each of the multiple displayable resources identified within the data file.

In some aspects, the techniques described herein relate to a system, wherein the resource table stores immutable records associated with a default locale, each of the immutable records corresponding to a displayable resource that is presented to a user display during execution of the software product.

In some aspects, the techniques described herein relate to a method including: receiving a localization build request from a source control platform, the localization build request specifying a unique resource identifier and a value for each of multiple displayable resources associated with execution of a software product in a default geographic locale; for each displayable resource of the multiple displayable resources: determining a relevant recency timestamp for the displayable resource based on a build timestamp of the localization build request, the relevant recency timestamp for the displayable resource corresponding to an immutable record stored within a localization database; retrieving, based on the relevant recency timestamp for the displayable resource, at least one translated resource indexed in association with the relevant recency timestamp; adding the at least one translated resource to a localization build for the software product; and returning the localization build to the source control platform, the localization build being added to a downloadable package provided to an end user in association with the software product.

In some aspects, the techniques described herein relate to a method, wherein the unique resource identifier includes a resource name, a project identifier, and a branch identifier.

In some aspects, the techniques described herein relate to a method, wherein determining the relevant recency timestamp of the displayable resource further includes: determining a timestamp corresponding to a newest-in-time record indexed in association with the unique resource identifier and created prior to the build timestamp of the localization build request.

In some aspects, the techniques described herein relate to a method, wherein determining the relevant recency timestamp of the displayable resource further includes: querying a resource table of the localization database based on the unique resource identifier, the value of the displayable resource, and the build timestamp of the localization build request; and in response to querying the resource table, receiving one or more records from the localization database, wherein the relevant recency timestamp matches a timestamp of a newest-in-time record selected from the one or more records.

In some aspects, the techniques described herein relate to a method, further includes: querying a resource table of the localization database based on the unique resource identifier, the value of the displayable resource, and the build timestamp of the localization build request; and in response to determining that the resource table does not include a resource record indexed in association with the unique resource identifier and the value of the displayable resource, creating a new record in the resource table for the displayable resource, wherein the relevant recency timestamp matches a build timestamp of the localization build request.

In some aspects, the techniques described herein relate to a method, wherein retrieving the at least one translated resource further includes: querying a translation table based on the unique resource identifier and the relevant recency timestamp of the displayable resource.

In some aspects, the techniques described herein relate to a method, wherein the translation table stores immutable translation records.

In some aspects, the techniques described herein relate to a method, wherein the method further includes requesting generation of the at least one translated resource in response to determining that the translation table does not include a record matching the unique resource identifier and the relevant recency timestamp.

In some aspects, the techniques described herein relate to a method, wherein the localization build request specifies a plurality of geographic locales and requesting generation of the at least one translated resource further includes: obtaining at least one translated record from the translation table indexed in association with the unique resource identifier and the relevant recency timestamp for the displayable resource; adding the at least one translated record to the localization build.

In some aspects, the techniques described herein relate to one or more tangible computer-readable storage media encoding computer-executable instructions for executing a computer process including: receiving a localization build request from a source control platform, the localization build request specifying a unique resource identifier and a value for a displayable resource, the displayable resource being associated with execution of a software product in a default geographic locale; determining a relevant recency timestamp for the displayable resource based on a build timestamp of the localization build request, the relevant recency timestamp for the displayable resource corresponding to an immutable record stored within a localization database; retrieving, based on the relevant recency timestamp for the displayable resource, at least one translated resource corresponding to the displayable resource; adding the at least one translated resource to a localization build for the software product; and outputting the localization build to the source control platform, the localization build being added to a downloadable package provided to an end user in association with the software product.

In some aspects, the techniques described herein relate to one or more tangible computer-readable storage media, wherein the unique resource identifier includes a resource name, a project identifier, and a branch identifier.

In some aspects, the techniques described herein relate to one or more tangible computer-readable storage media, wherein determining the relevant recency timestamp of the displayable resource further includes: determining a timestamp corresponding to a newest-in-time indexed in association with the unique resource identifier and created prior to the build timestamp of the localization build request.

In some aspects, the techniques described herein relate to one or more tangible computer-readable storage media, wherein determining the relevant recency timestamp of the displayable resource further includes: querying a resource table of the localization database based on the unique resource identifier and the build timestamp of the localization build request; in response to querying the resource table, receiving one or more records from the localization database and determining the relevant recency timestamp of the displayable resource based on a record timestamp of a newest-in-time record selected from the one or more records.

In some aspects, the techniques described herein relate to one or more tangible computer-readable storage media, wherein the computer process further includes: in response to determining that the resource table does not include a record indexed in association with the unique resource identifier, creating a new record in the resource table for the displayable resource and determining the relevant recency timestamp for the displayable resource based on the build timestamp of the localization build request; requesting generation of at least one translated resource based on the value of the displayable resource; and indexing at least one translated resource in association with the unique resource identifier and the relevant recency timestamp in a translation table.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A system for managing localized resources displayable during execution of a software product, the system including:
   memory;
   a processing system;
   a cumulative localization database stored in the memory, the cumulative localization database storing immutable time-stamped records corresponding to displayable resources accessed during execution of a software product;
   a resource record retriever stored in the memory and executable by the processing system to:
      receive, for a displayable resource identified in a localization build request, a unique resource identifier and a resource value, the displayable resource being one of multiple displayable resources identified within a data file provided as an input to the localization build request; and
      create an immutable record in the cumulative localization database for each different one of the multiple displayable resources identified within the data file, the immutable record for the displayable resource including the unique resource identifier, the resource value, and a build timestamp of the localization build request;
   a translated resource retriever stored in memory and executable to:
      request a translation of the resource value corresponding to a geographic locale specified in the localization build request;
      create, within a translation table of the cumulative localization database, a translation record that includes the translation, the unique resource identifier, and the build timestamp; and
      add the translation record to a localization build for the software product, wherein the system outputs the localization build to a source control platform.

2. The system of claim 1 wherein the unique resource identifier includes a resource name, a project identifier, and a branch identifier.

3. The system of claim 1, wherein the build timestamp corresponds to a versioning timestamp associated with a version of source code for the software product stored within the source control platform.

4. The system of claim 1, wherein the resource record retriever is further configured to:
   query a resource table of the cumulative localization database for records within a time interval having an end defined based on the build timestamp of the localization build request; and
   in response to determining that the resource table does not include a record indexed in association with the unique resource identifier, create the translation record.

5. The system of claim 4, wherein the resource table stores immutable records associated with a default locale, each of the immutable records corresponding to a displayable resource that is presented to a user display during execution of the software product.

6. A method comprising:
   receiving a localization build request from a source control platform, the localization build request specifying a unique resource identifier and a value for each of multiple displayable resources associated with execution of a software product in a default geographic locale;
   for each displayable resource of the multiple displayable resources:
      querying a resource table of a localization database based on the unique resource identifier, the value of the displayable resource, and a build timestamp of the localization build request;
      receiving, in response to querying the resource table, one or more immutable records from the localization database;

determining a relevant recency timestamp for the displayable resource, the relevant recency timestamp for the displayable resource matching a timestamp of a newest-in-time record selected from the one or more immutable records;

retrieving, based on the relevant recency timestamp for the displayable resource, at least one translated resource indexed in association with the relevant recency timestamp;

adding the at least one translated resource to a localization build for the software product; and returning the localization build to the source control platform, the localization build being added to a downloadable package provided to an end user in association with the software product.

7. The method of claim 6, wherein the unique resource identifier includes a resource name, a project identifier, and a branch identifier.

8. The method of claim 6, wherein determining the relevant recency timestamp of the displayable resource further comprises:

determining a timestamp corresponding to a newest-in-time record indexed in association with the unique resource identifier and created prior to the build timestamp of the localization build request.

9. The method of claim 6, further comprises:

querying a resource table of the localization database based on the unique resource identifier, the value of the displayable resource, and the build timestamp of the localization build request; and in response to determining that the resource table does not include a resource record indexed in association with the unique resource identifier and the value of the displayable resource, creating a new record in the resource table for the displayable resource, wherein the relevant recency timestamp matches a build timestamp of the localization build request.

10. The method of claim 7, wherein retrieving the at least one translated resource further includes:

querying a translation table based on the unique resource identifier and the relevant recency timestamp of the displayable resource.

11. The method of claim 10, wherein the translation table stores immutable translation records.

12. The method of claim 10, wherein the method further includes requesting generation of the at least one translated resource in response to determining that the translation table does not include a record matching the unique resource identifier and the relevant recency timestamp.

13. The method of claim 10, wherein the localization build request specifies a plurality of geographic locales and requesting generation of the at least one translated resource further includes:

obtaining at least one translated record from the translation table indexed in association with the unique resource identifier and the relevant recency timestamp for the displayable resource;

adding the at least one translated record to the localization build.

14. One or more tangible computer-readable storage media encoding computer-executable instructions for executing a computer process comprising:

receiving a localization build request from a source control platform, the localization build request specifying a unique resource identifier and a value for a displayable resource, the displayable resource being associated with execution of a software product in a default geographic locale;

querying a resource table of a localization database based on the unique resource identifier and a build timestamp of the localization build request;

in response to querying the resource table, receiving one or more records from the localization database;

determining a relevant recency timestamp for the displayable resource based on a record timestamp of a newest-in-time record selected from the one or more records, the relevant recency timestamp for the displayable resource corresponding to an immutable record stored within a localization database;

retrieving, based on the relevant recency timestamp for the displayable resource, at least one translated resource corresponding to the displayable resource;

adding the at least one translated resource to a localization build for the software product; and outputting the localization build to the source control platform, the localization build being added to a downloadable package provided to an end user in association with the software product.

15. The one or more tangible computer-readable storage media of claim 14, wherein the unique resource identifier includes a resource name, a project identifier, and a branch identifier.

16. The one or more tangible computer-readable storage media of claim 14, wherein determining the relevant recency timestamp of the displayable resource further comprises:

determining a timestamp corresponding to a newest-in-time indexed in association with the unique resource identifier and created prior to the build timestamp of the localization build request.

17. The one or more tangible computer-readable storage media of claim 14, wherein the computer process further comprises:

in response to determining that the resource table does not include a record indexed in association with the unique resource identifier, creating a new record in the resource table for the displayable resource and determining the relevant recency timestamp for the displayable resource based on the build timestamp of the localization build request;

requesting generation of at least one translated resource based on the value of the displayable resource; and indexing at least one translated resource in association with the unique resource identifier and the relevant recency timestamp in a translation table.

* * * * *